United States Patent [19]
Jeddeloh

[11] Patent Number: 6,049,855
[45] Date of Patent: *Apr. 11, 2000

[54] SEGMENTED MEMORY SYSTEM EMPLOYING DIFFERENT INTERLEAVING SCHEME FOR EACH DIFFERENT MEMORY SEGMENT

[75] Inventor: Joseph Jeddeloh, Minneapolis, Minn.

[73] Assignee: Micron Electronics, Inc., Nampa, Id.

[*] Notice: This patent is subject to a terminal disclaimer.

[21] Appl. No.: 08/887,042

[22] Filed: Jul. 2, 1997

[51] Int. Cl.⁷ ...................................................... G06F 12/06
[52] U.S. Cl. ................................ 711/157; 711/5; 710/128
[58] Field of Search ................................ 711/5, 157, 170, 711/201, 217; 365/230.04, 230.06; 710/128

[56] References Cited

U.S. PATENT DOCUMENTS

| | | | |
|---|---|---|---|
| 4,099,231 | 7/1978 | Kotok et al. | 711/168 |
| 4,709,332 | 11/1987 | Morrison et al. | 600/431 |
| 4,740,911 | 4/1988 | Shar et al. | 711/157 |
| 5,226,133 | 7/1993 | Alderequira et al. | 711/207 |
| 5,269,009 | 12/1993 | Herzl et al. | 711/5 |
| 5,269,010 | 12/1993 | MacDonald | 711/141 |
| 5,274,788 | 12/1993 | Koike | 711/157 |
| 5,544,124 | 8/1996 | Zagar et al. | 365/230.08 |
| 5,559,953 | 9/1996 | Seiler et al. | 345/507 |
| 5,579,277 | 11/1996 | Kelly | 365/230.02 |
| 5,701,434 | 12/1997 | Nakagawa | 711/157 |
| 5,765,182 | 6/1998 | Lau et al. | 711/5 |

OTHER PUBLICATIONS

Shanley and Anderson, "ISA System Architecture," Addison–Wesley Publishing Co., 3ʳᵈ Ed., pp. 235–272, Feb. 1995.

*Primary Examiner*—Hiep T. Nguyen
*Attorney, Agent, or Firm*—Dorsey & Whitney LLP

[57] ABSTRACT

A computer system has first and second random access memory (RAM) modules for storing digital information, and first and second system controllers coupled to the first and second RAM modules, respectively. The first system controller has a first address decoder that allocates to the first RAM module a first set of addresses. The second system controller has a second address decoder that allocates to the second RAM module a second set of addresses. By employing two system controllers to control two RAM modules, a computer system can execute two memory transactions simultaneously and can eliminate or reduce the number of memory access delays incurred. The computer system can allocate addresses according to various interleaving schemes, such as page interleaving, cache line interleaving and word interleaving for different memory segments. A configuration register can be employed to allow programming to select which of the interleaving schemes to employ.

9 Claims, 4 Drawing Sheets

SEGMENTED MEMORY SYSTEM EMPLOYING DIFFERENT INTERLEAVING SCHEME FOR EACH DIFFERENT MEMORY SEGMENT

TECHNICAL FIELD

The present invention relates to computer memory access, and more particularly, to a computer system having dual memory arrays that are accessed with dual memory controllers.

BACKGROUND OF THE INVENTION

A computer system relies on memory to store instructions and data that are processed by a computer system processor. Breathtaking advances have been made in both the storage capacity and speed of computer memory devices. However, the speed of memory devices has not been able to keep pace with the speed increases achieved with current microprocessors. As a result, the speed of current computer systems is limited by the speed in which data and instructions can be accessed from the system memory of the computer system.

In a typical computer system, the computer system processor communicates with the computer memory via a processor bus and a memory controller. The computer system memory typically includes a dynamic random access memory (DRAM) module, such as a single in-line memory module (SIMM) or a dual in-line memory module (DIMM). The memory module typically includes one or more banks of memory chips connected in parallel such that each memory bank stores one word of data per memory address.

One reason for delay in typical memory modules is that each memory chip includes one or more data lines that handle both data being written into the memory chip and data being read from the memory chip. Likewise, the memory controller may include a data bus that handles data written to and read from each memory chip. Alternatively, the data bus of the memory chip may be coupled directly to a data bus portion of the processor bus. As a result, each time access to the memory switches from a read to a write or a write to a read, data must go completely through the memory data bus, and possibly the memory controller data bus, before data can be sent through the busses in the opposite direction. The time it takes to wait for the memory bus and possibly the memory controller bus to switch from one direction to the opposite direction is known as bus turn-around time and typically is at least one clock cycle of delay.

In a typical DRAM memory, each memory chip contains an array of memory cells connected to each other by both row and column lines. Each memory cell stores a single bit and is accessed by a memory address that includes a row address that indexes a row of the memory array and a column address that indexes a column of the memory array. Accordingly, each memory address points to the memory cell at the intersection of the row specified by the row address and the column specified by the column address.

In order to limit their size, each memory chip typically includes only enough address pins to specify either the row address or the column address but not both simultaneously. As a result, the typical memory controller accesses a memory location sequentially by first transmitting the row address and then transmitting the column address. Specifically, the memory address controller places the row address on the memory address bus, asserts a row address select (RAS) control signal, then places the column address on the memory address bus and asserts a column address select (CAS) control signal. To ensure proper timing, the memory controller delays briefly after asserting the RAS control signal and before asserting the CAS signal (RAS/CAS delay).

Another memory delay, known as pre-charge delay, typically occurs after each memory read. A memory read of a DRAM location is implemented by discharging the memory cell and then completely recharging the memory cell. The pre-charge delay refers to the amount of time that it takes to complete the recharging step.

A technique known as "page mode" has been developed to eliminate the RAS/CAS and pre-charge delays when successive accesses to the same row of memory occur (each row is known as a "page" and typically is four kilobytes (KB)). Because the majority of program execution is sequential in nature, program execution very often proceeds along a row of memory. When in page mode, a row comparator in the memory controller compares the row address of the memory location currently being accessed with the row address for the next memory access. If the row addresses are the same (known as a "page hit"), then the row comparator causes the memory controller to continue asserting the RAS control signal at the end of the current bus cycle. Because the memory already has the correct row address, the new column address can be immediately transferred to the memory without requiring a RAS/CAS or pre-charge delay. However, if the row addresses of the current and next memory requests are different (known as "page miss") then RAS/CAS and pre-charge delays are incurred.

The number of pre-charge delays also can be reduced by splitting the system memory into two memory banks and interleaving the memory locations in the two banks. Interleaving refers to reading or writing consecutive data in alternate memory banks such as storing all even-addressed data in the first memory bank and all odd-addressed data in the second memory bank. When an interleaved system memory is employed to implement consecutive reads of consecutively addressed data items, the second data item can be read from the second memory bank while the first memory bank is being pre-charged after the first data item is read from the first memory bank. As a result, the pre-charge delay is hidden each time that a data item is accessed from a memory bank that is different from the memory bank from which the previous data item is accessed.

Although the procedures discussed above reduce the number of delays in accessing data, typical computer memory still is relatively slow compared to the computer system processor bus. For example, a standard type of memory known as Extended Data Out (EDO) memory typically operates at half of the rate of the processor bus. Moreover, the delays discussed above still occur on a regular basis. In particular, read/write delays still occur when switching from a read to a write or vice versa, RAS/CAS delays still occur when switching between memory rows accessed, and pre-charge delays still occur for consecutive reads to the same memory bank. This situation is made worse when one or more memory requesters submit memory requests simultaneously in addition to the memory requests from the computer system processor. Prior art memory controllers simply employ a rotational priority scheme in which the particular memory requester enabled to submit a memory request is switched after each memory request. Such a rotational priority scheme reduces the chances of receiving consecutive read or write requests to the same memory row and increases the number of switches from reads to writes and the number of consecutive requests to the same memory bank, thereby increasing the number of memory access delays.

SUMMARY OF THE INVENTION

An embodiment of the present invention is directed to a computer system having first and second random access memory (RAM) modules for storing digital information. The computer system also includes first and second system controllers coupled to the first and second RAM modules, respectively. The first system controller has a first address decoder that allocates to the first RAM module a first set of addresses. The second system controller has a second address decoder that allocates to the second RAM module a second set of addresses, having no addresses in common with the first set of addresses. By employing two system controllers to control two RAM modules, the computer system can execute two memory transactions simultaneously and can eliminate or reduce the number of read/write, RAS/CAS, and pre-charge delays incurred.

In one embodiment, the first set of addresses is interleaved with the second set of addresses such that an address block of the second set is immediately proceeded and immediately followed by address blocks of the first set. The size of the address blocks being interleaved can be a page, cache-line, word, or any other size smaller than the sizes of the RAM modules. Alternatively, the RAM modules can be segmented such that first segments of the first and second RAM modules can be interleaved based on a first block size and second segments of the first and second RAM modules can be interleaved based on a second block size. In another alternative embodiment, the first and second sets of addresses are not interleaved such that all of the addresses of the first set are contiguous and less than all of the addresses of the second set. A configuration register can be employed to allow appropriate programming to select which of the interleaving schemes to employ.

BRIEF DESCRIPTION OF DRAWINGS

FIG. 3 is a block diagram of cash-line interleaved memory modules of the computer system show FIG. 1.

FIG. 4 is a block diagram of word interleaved memory modules of the computer system shown in FIG. 1.

DETAILED DESCRIPTION OF THE INVENTION

Figure 1:
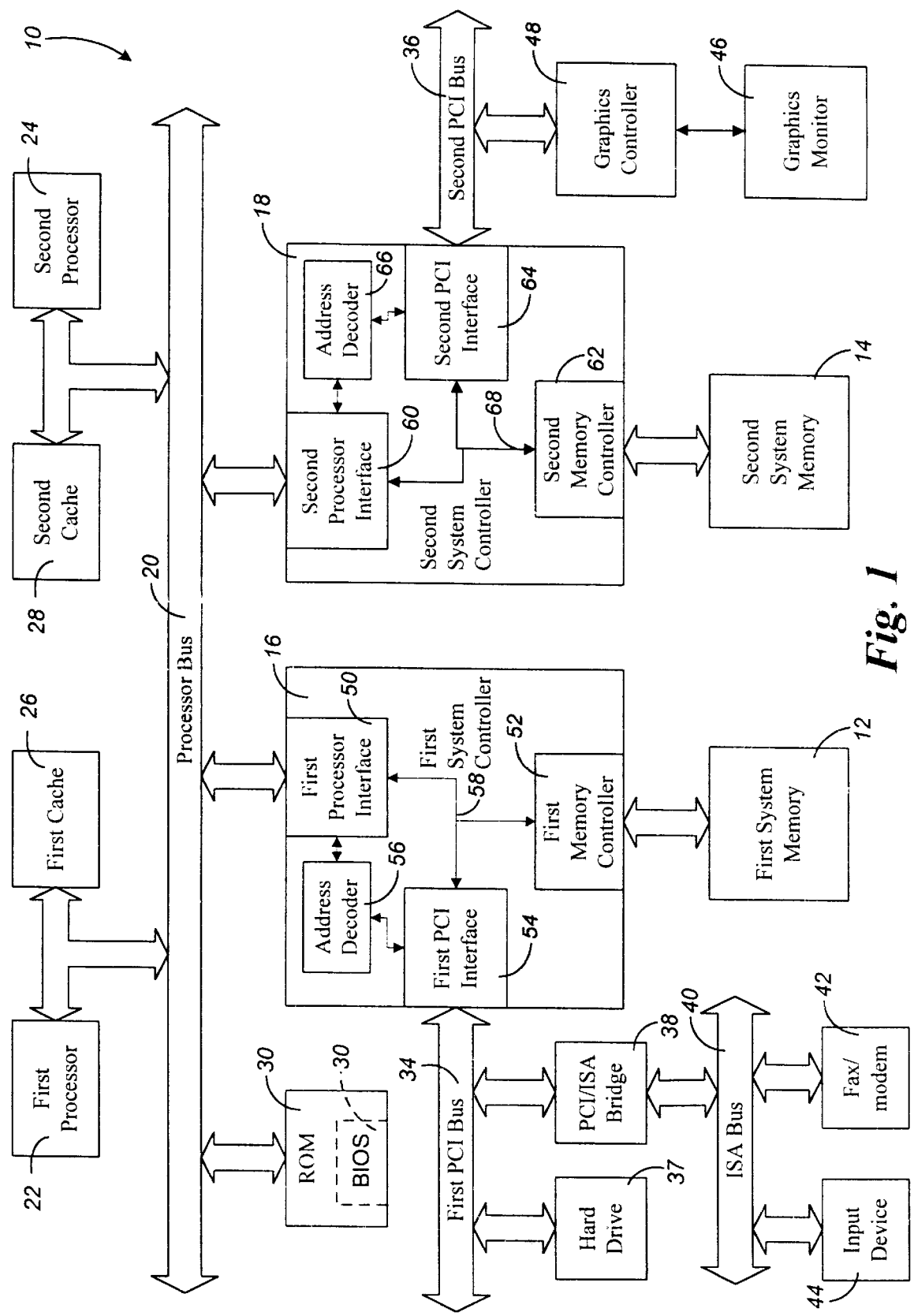
FIG. 1 is a block diagram of one embodiment of a computer system according to the present invenntion.

A computer system 10 for processing memory requests for access to first and second system memory modules 12, 14 according to an embodiment of the present invention is shown in FIG. 1. Each of the memory modules 12, 14 can be any of numerous types of memory modules, such as a double in-line memory module (DIMM). Each of the memory modules 12, 14 includes a set of DRAM memory chips structured to store data and computer instructions. Each of the memory modules 12, 14 could include memory other than DRAM, such as static random access memory (SRAM). In one embodiment, the memory modules 12, 14 include synchronous DRAM, but asynchronous DRAM also could be employed.

The computer system 10 includes first and second system controllers 16, 18 coupled to the first and second memory modules 12, 14, respectively. Each of the system controllers 16, 18 is coupled via a processor bus 20 to first and second computer processors 22, 24 and first and second memory caches 26, 28. Also coupled to the processor bus 20 is a read-only memory (ROM) module 30 that stores basic input-output system (BIOS) software 32. The ROM module 30 may include memory that can be re-programmed, such as electrically erasable programmable read-only memory (EEPROM).

The computer system 10 also includes expansion buses, such as a first peripheral component interconnect (PCI) bus 34, coupled to the first system controller 16 and a second PCI bus 36 coupled to the second system controller 18. Coupled to the first PCI bus 34 is a hard drive 37 and a PCI/ISA bridge 38 that couples the first PCI bus 34 to an Industry Standard Architecture (ISA) bus 40. Coupled to the ISA bus 40 are a fax modem 42 and an input device 44, such as a keyboard, mouse, or electronic pen/tablet. The computer system 10 also includes a graphics monitor 46 coupled to the second PCI bus 36 by a graphics controller 48 that controls the output of graphical and non-graphical information on the graphics monitor 46.

The first and second system controllers 16, 18 provide interfaces between the system memory modules 12, 14; processor bus 20; and first and second PCI buses 34, 36. The first system controller 16 includes a first processor interface 50 that controls how data is received from or sent to the processors 22, 24 and the caches 26, 28 by the first system controller 16. The first system controller 16 also includes a first memory controller 52 that controls how data is written to and read from the first system memory module 12. The first system controller 16 also includes a first PCI interface 54 that controls how data is sent and received from the first PCI bus 34.

The first system controller 16 also includes a first address decoder 56 determines whether transactions transmitted on the processor bus 20 or the first PCI bus 34 are directed to the first system memory 12. If the first address decoder 56 determines that a transaction is being directed from the processor bus 20 to the first system memory 12, then the first processor interface 50 forwards the transaction on a first system controller bus 58 to the first memory controller 52 which controls the execution of the transaction by the first system memory 12. Similarly, if the address decoder 56 determines that the transaction is being directed from the processor bus 20 to the first PCI bus 34, then the first processor interface 50 forwards the transaction on the first system controller bus 58 to the first PCI interface 54 which forwards the transaction to the first PCI bus 34. In addition, if the address decoder 56 determines that the transaction is being directed from the first PCI bus 34 to the processor bus 20, then the first PCI interface 54 forwards the transaction on the first system controller bus 58 to the first interface 50 which forwards the transaction to the processor bus 20.

The second system controller 18 includes a second processor interface 60 that controls how data is received from or sent to the processors 22, 24 and caches 26, 28 by the second system controller 18. The second system controller 18 also includes a second memory controller 62 that controls how data is written to and read from the second system memory 14. The second system controller 18 also includes a second PCI interface 64 that controls how data is sent on and received from the second PCI bus 36 by the second system controller 18.

The second system controller 18 includes a second address decoder 66 that determines whether transactions transmitted on the processor bus 20 or the second PCI bus 36 are directed to the second system memory 14. The second address decoder 66 functions with interfaces 60–64 in essentially the same manner that the first address decoder 56 in the first system controller 16 functions with the interfaces 50-54 as explained above.

By employing two system memory modules 12, 14 and two system controllers 16, 18, the computer system 10 provides faster transaction processing than prior art systems employing a single system memory and a single memory controller. In particular, two memory transactions can be executed simultaneously by executing one transaction using the first system memory 12 while another transaction is being executed by the second system memory 14. In addition, the logical addresses for the first and second system memory modules 12, 14 can be interleaved to reduce pre-charge delays and/or RAS/CAS delays. Alternatively, the computer system 10 can reduce read/write delays by storing data that are mostly read in one of the system memory modules 12, 14 while storing other data in the other one of the system memory modules. For example, software instructions and much graphics data typically are read many times without ever being changed or written to. As such, the software instructions and graphics data can be stored in the second memory module 14 while other data are stored in the first memory module 12. Thus, consecutive memory transactions directed to the second memory module 14 likely would read transactions that could be processed without incurring any read/write delays.

Interleaving the logical addresses for the system memory modules 12, 14 involves allocating alternate individual logical addresses or blocks of logical addresses to the first and second system memory modules. That is, a first address decoder 56 allocates logical addresses or blocks of logical addresses to the first system memory 12 that alternate with logical addresses or blocks of logical addresses that are allocated to the second system memory 14 by the second address decoder 66. Thus, if one of the processors 22, 24 requests access to consecutive logical addresses or logical address blocks, the first address decoder 56 will recognize that one of the logical addresses or logical address blocks has been allocated to the first system memory module 12 and the second address decoder 66 will recognize that an immediately proceeding or immediately following one of the logical addresses or logical address blocks has been allocated to the second system memory module 14.

Figure 2:
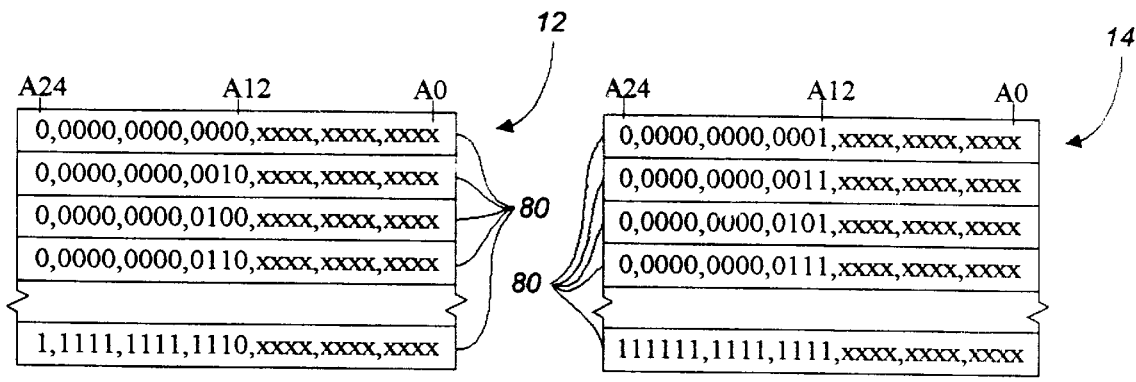
FIG. 2 is a block diagram of page interleaved memory modules of the computer system shown in FIG. 1.

In a first embodiment of the invention shown in FIG. 2, the logical address blocks being interleaved in the system memory modules 12, 14 are pages (typically four kilobytes (KB)). Each of the system memory modules 12, 14 includes a plurality of pages 80 each including four KB of storage locations addressed by four KB of logical addresses. The numbers shown in the pages 80 of FIG. 2 are the logical addresses assigned to the pages with "x" indicating a zero or a one. Each logical address includes 24 bits ranging from bit A0 to A24, for a total of 32 megabytes (MB) $2^{25}$=32M) logical addresses.

FIG. 2 shows that the logical addresses assigned to the first system memory module 12 differ from logical addresses assigned to the second system memory module 14 only with respect to bit A12 of the logical addresses. For example, the first row of the storage locations for the first system memory module 12 is allocated logical addresses ranging from zero to four kilobytes minus one (0,1111,1111,1111). The first row of storage locations for the second system memory module 14 is allocated logical addresses ranging from four kilobytes (1,0000,0000,0000) to eight kilobytes minus one (1,1111,1111,1111). As such, the address decoders 56, 66 determine that a transaction is directed to the first system memory module 12 if the transaction is directed to an address having a zero for bit A12 and the transaction is directed to the second system memory module 14 if the transaction is directed to an address having a one for bit A12.

Figures 3, 4:
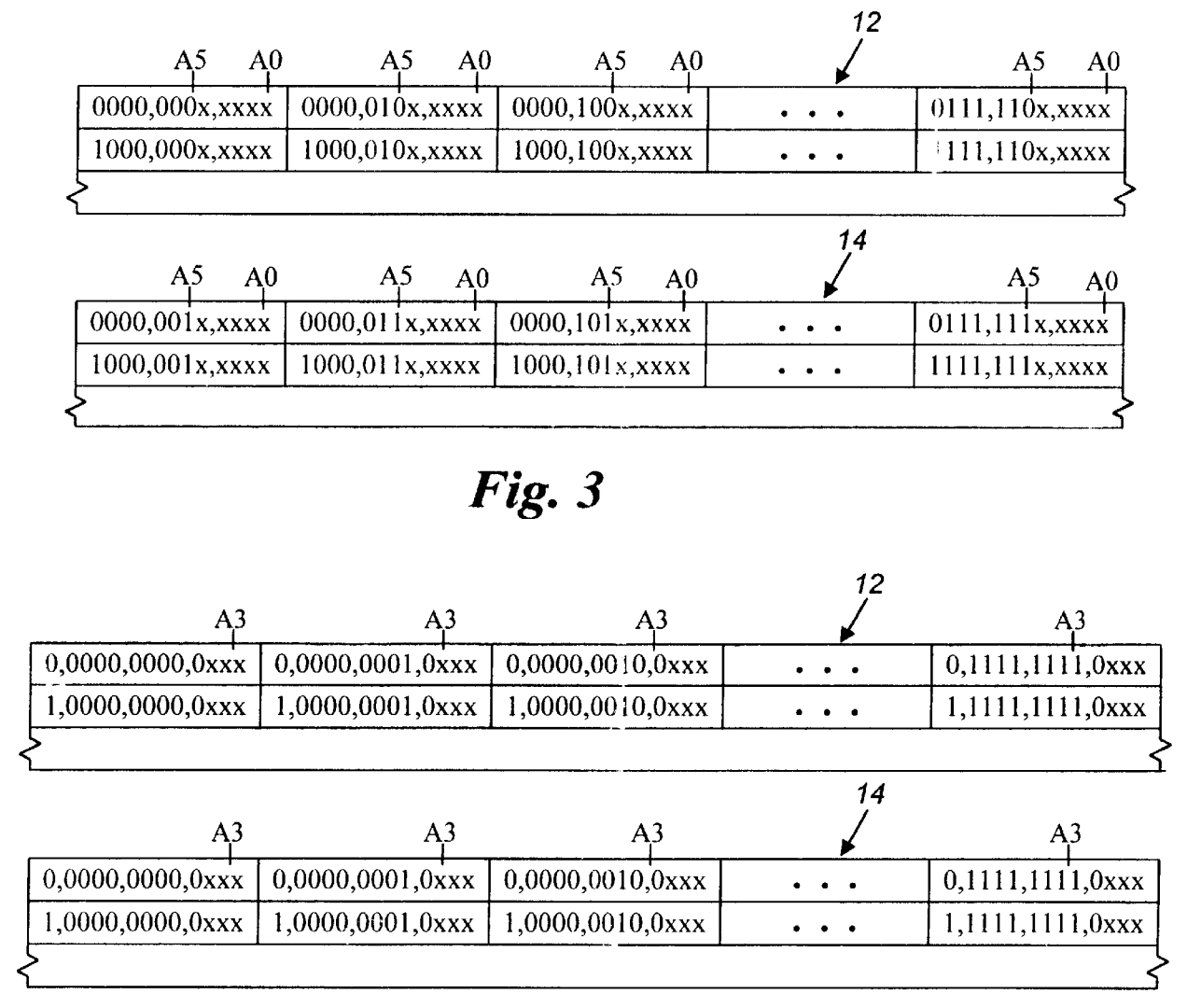

In a second embodiment of the invention shown in FIG. 3, the system memory modules 12, 14 are interleaved on a cache line basis. A cache line refers to the number of storage locations that are copied into one of the caches 26, 28 each cache transaction. In the embodiment shown in FIG. 3, each cache line is 32 bytes, as is the case with the Intel Pentium Pro™ processor, although other cache line sizes can be employed depending on the processors 22, 24 being used. Thus, the logical addresses assigned to the first and second system memory modules 12, 14 alternate in 32-byte blocks. For example, logical addresses zero through 31 (01,1111) and 64 (100,0000) through 95 (101,1111) are assigned to the first system memory module 12 and logical addresses 32 (10,0000) through 63 (11,1111) are assigned to the second system memory module 14. It will be appreciated that the logical addresses assigned to the first system memory module 12 differ from the logical addresses assigned to the second system memory module 14 based on the value of address bit A5. Accordingly, the first and second address decoders 56, 66 will recognize that a transaction having a logical address with a zero in the A5-bit position should be directed to the first system memory module 12 and a transaction having a logical address with a one in the A5-bit position should be directed to the second system memory module 14.

In a third embodiment of the invention shown in FIG. 4, the system memory modules 12, 14 are interleaved on a word basis. In the embodiment shown in FIG. 4, each word is eight bytes in length (64 bits) as is the case with the Intel Pentium Pro™ processor, although other word lengths can be employed. As such, the logical addresses assigned to the first and second system memory modules 12, 14 alternate every eight storage locations. For example, logical addresses zero through seven (111) and 16 (1,0000) to 23 (1,0111) are assigned to the first system memory modules 12 while logical addresses eight (1000) to 15 (1111) and 24 (1,1000) to 31 (1,1111) are allocated to the second system memory module 14. It will be appreciated that the addresses assigned to the first and second system memory modules 12, 14 differ according to the value of address bit A3. Thus, the address decoders 56, 66 will recognize that a transaction having a logical address with a zero in the A3-bit position should be directed to the first system memory module 12 and a transaction having a logical address with a one in the A3-bit position should be directed to the second system memory module 14.

The type of interleaving employed may depend on the type of memory used in the system memory modules 12, 14. If synchronous DRAM is employed for the system memory modules 12, 14, then it can be advantageous to employ page interleaving. If the system memory modules 12, 14 are synchronous DRAM modules, then each of the system memory modules 12, 14 can be accessed at rate that matches the speed of the processor bus 20 until a page miss occurs. A page miss occurs when consecutive transactions are directed to two different pages (memory array rows) of the same memory bank. In prior art computer systems that employ only a single system memory module, such a page miss would result in a delay being incurred to allow the single system memory module to access the new memory page. In contrast, the computer system 10 enables the first system memory module 12 to execute a first transaction directed to a page of the first system memory module 12 while the second system memory module 14 begins executing a second transaction directed to a page of the second system memory module. Cache line or word interleaving could be employed with synchronous DRAM modules, but would not provide any speed benefit because such synchronous DRAM modules already can be accessed at the speed of the processor bus 20 for consecutive words or cache lines of a given page.

If asynchronous DRAM is employed for the system memory modules 12, 14, then it may be more advantageous to employ cache line or word interleaving than page interleaving. Asynchronous DRAM memory modules, such as EDO memory modules, typically run at half of the rate of the processor bus 20 because of the pre-charge delays that are incurred on consecutive read transactions. In systems that access an entire cache line for each transaction, cache line interleaving likely would be the most appropriate in order to prevent pre-charge delays being incurred between consecutive read transactions. That is, one of the system memory modules 12, 14 pre-charges while the other system memory module executes a memory transaction so that one of the system memory modules 12, 14 is always ready to read a new cache line. As a result, with both system memory modules 12, 14 running at half the rate of the processor bus 20, the overall effect is that memory is being accessed at the same rate as the processor bus 20. Word interleaving would be most appropriate for systems that access a single word in each transaction.

Figure 5:
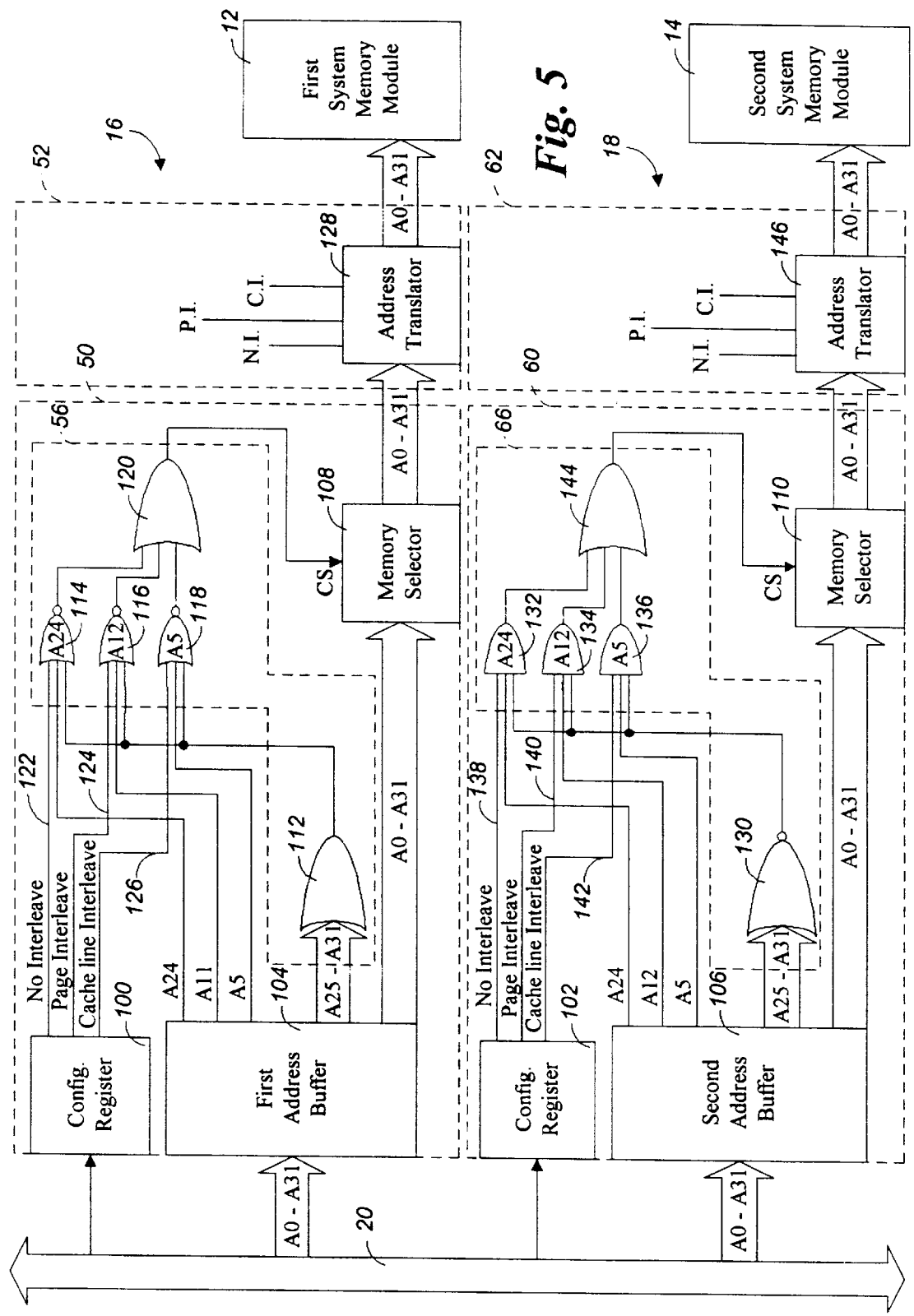
FIG. 5 is a block diagram of dual memory controllers of the computer system shown in FIG. 1

A block diagram of the system memory modules 12, 14; system controllers 16, 18; and processor bus 20 according to a fourth embodiment of the invention is shown in FIG. 5. In the fourth embodiment shown in FIG. 5, each of the system controllers 16, 18 is programmable to enable page interleaving, cache line interleaving, or no interleaving as desired by a user. In addition, one type of interleaving can be employed in first portions of the system memory modules 12, 14 and a second type of interleaving or no interleaving can be employed in second portions of the system memory modules 12, 14. The system controllers 16, 18 can be programmed to enable one type of interleaving or no interleaving for the entire system memory modules 12, 14.

The first and second system controllers 16, 18 include first and second configuration registers 100, 102, respectively, that provide users with the ability to choose which type of interleaving to employ. The interleaving options of the configuration registers 100, 102 can be set by the BIOS 32 stored in the system ROM 30. Preferably, the system ROM 30 is implemented using EEPROM or other changeable memory so that the BIOS software 32 can be programmed to change the type of interleaving to be employed. Alternatively, the configuration registers 100, 102 could be given addresses that are accessible to operating system of the computer system 10 so that the interleaving options can be set by the user more easily.

The first and second system controllers 16, 18 also include first and second address buffers 104, 106, respectively, that are coupled to the processor bus 20. The address buffers 104, 106 obtain and temporarily store the address of each transaction transmitted on the processor bus 20. The first and second address buffers 104, 106 store the addresses long enough for the respective address decoders 56, 66 to determine whether the addresses are directed to the system memory modules 12, 14.

The first and second system controllers 16, 18 also include first and second memory selectors 108, 110, respectively, that are coupled to the first and second address buffers, respectively. The memory selectors 108, 110 receive address bits A0 through A31 for each transaction and forward the address bits to the corresponding memory controller 52, 62 upon receiving a chip select signals (CS) from the corresponding address decoder 56. The first address decoder 56 transmits the chip select signal to the first memory selector 108 if the first address decoder determines that the logical address included in the transaction has been allocated to the first system memory module 12. The second address decoder 66 transmits the chip select signal to the second memory selector 110 if the second address decoder determines that the logical address included in the transaction has been allocated to the second system memory module 14.

The first address decoder 56 includes a first OR gate 112 that receives address bits A25 through A31 from the first address buffer 104. The first address decoder 56 also includes three NOR gates 114, 116, 118 coupled between the first OR gate 112 and a second OR gate 120. In the embodiment shown in FIG. 5, each of the system memory modules 12, 14 can store 16 megabytes (MB) of information for a total of 32 MB. Only address bits A0–A24 are needed to address 32 megabytes so if any of address bits A25 through A31 are set to logical 1, then the transaction is not directed to the system memory modules 12, 14. If any of the address bits A25 through A31 for a transaction are logical 1 then the first OR gate 112 will output a logic 1 to each of the NOR gates 114–118. In response, each of the NOR gates 114–118 will output a logic 0 to the second OR gate 118 which causes the second OR gate 118 to output a logic 0 to the first memory selector 108. Such a logic 0 is not the appropriate chip selection signal, so the memory selector does not forward the address bits of the transaction to the first memory controller 52. As such, the memory selector 120 is simply a switch that is controlled by the first address decoder 56.

The first configuration register 100 outputs an active low signal on whichever one of the output lines 122–126 corresponds to the selected interleaving choice and an active high signal on each of the output lines corresponding to the interleaving choices not selected. For example, if no interleaving has been selected, then the first configuration register 100 outputs a logic 0 on the "no interleave" output line 122 and outputs logic 1 on the "page interleave" and "cache line interleave" output lines 124, 126.

The NOR gates 114–118 determine whether a transaction is directed to the first system memory module 12 based on the interleaving choice selected by the configuration register 100 and the appropriate address bits of the address included in the transaction. The NOR gates 114–118 are coupled to receive address bits A24, A12, and A5 from the first address buffer 104. If no interleaving has been selected then logical addresses 0 through 16M−1 (address bits A0–A23 are 0 or 1 and address bits A24–A31 are logic 0) are assigned to the first system memory module 12 and logical addresses 16M through 32M−1 (address bit A24 is logic 1, address bits A0–A23 are logic 0 or logic 1) are assigned to the second system memory module 14. As such, if no interleaving is selected and a receipt transaction has address bits A24–A31 at logic 0, then the first NOR gate 114 will receive three logic zeros as inputs and thus will output a logic 1 to the second OR gate 120. In response to the logic 1 proceed from the first NOR gate 114, the second NOR gate 120 will output a logic 1 chip select signal to the first memory selector 108 which responds by forwarding the address bits of the transaction to the first memory controller 52.

If page interleaving has been selected, then the first configuration register 100 outputs a logic 0 signal on the page interleave output line 124 to the second NOR gate 116. If a transaction is received with address bits A12 and A25–A31 being logic 0s, then the second NOR gate 116 will receive three logic 0s as inputs and will respond by outputting a logic 1 to the second OR gate 120. In response, the second NOR gate 120 will output the logic 1 chip select signal to the first memory selector 108 which responds by forwarding the address bits to the first memory controller 52.

If cache line interleaving has been selected, then the configuration register outputs a logic 0 from the cache line interleaving output line 126 to the third NOR gate 118. If a transaction is received with address bits A5 and A25–A31 being logic 0s, then the third NOR gate 118 will receive three logic 0 inputs and will output a logic 1 to the second OR gate 120. In response, the second OR gate 120 will output a logic 1 chip select signal to the first memory selector 108 which responds by allowing the address bits A0–A24 to pass to the memory controller 52.

The first memory controller 52 includes a first address translator 128 that translates the logical addresses received from the first memory selector 108 to physical addresses that are used to access the first system memory module 12. The first system memory module 12 expects to be addressed according to a continuous sequence of physical addresses. If the logical addresses are interleaved, then there are gaps in the logical addresses allocated to the first system memory module 12 to accommodate the logical addresses allocated to the second system memory module 14. The first address translator 128 removes the gaps in the logical addresses to form the continuous sequence of physical addresses.

The first address translator 128 is coupled to receive from the first configuration register 100 a signal indicating whether no interleaving (N.I.), page interleaving (P.I.), or cache line interleaving (C.I.) has been selected. If no interleaving has been selected, then the address translator 128 simply forwards the logical address received from the memory selector 108 to the first system memory module 12 as a physical address. If page interleaving has been selected, then the first address translator 128 translates the logical address received from the first memory selector 108 to a physical address by subtracting 4K from the logical address. If cache line interleaving has been selected, then the first address translator 128 translates the logical address received from the first memory selector 108 to a physical address by subtracting 32 from the logical address.

The second address decoder 66 is similar to the first address decoder 56 except that the first OR gate 112 and NOR gates 114–118 are replaced with a first NOR gate 130 and 3 AND gates 132, 134, 136. It will be appreciated that the NOR gate 130 and AND gates 132–136 are logical complements of the OR gate 112 and NOR gates 114–118 and are used in order to account for the logic 1 values of the A24, A12, and A5 address bits being analyzed to determine whether the transaction is directed to the second system memory module 14. In addition, the second configuration register 102 is coupled to the AND gates 132–136 by a "no interleave," "page interleave," and "cache line interleave" output lines 138, 140, 142 respectively. The second configuration register 102 outputs an active high signal on whichever one of the output lines 138–142 corresponds to the selected interleaving choice and an active low signal on each of the output lines corresponding to the interleaving choices not selected. Coupled to the AND gates 132–136 is an OR gate 144 that transmits a chip select signal (CS) to the second memory selector 110 when any of the AND gates 132–136 outputs a logic one signal similar to the manner discussed above with respect to the OR gate 120 or the first address decoder 56.

The second memory controller 62 includes a second address translator 146 that translates the logical addresses received from the second memory selector 110 to physical addresses that are used to access the second system memory module 14. Like the first system memory module 12, the second system memory module 14 expects to be addressed according to a continuous sequence of physical addresses. If the logical addresses are interleaved, then there are gaps in the logical address allocated to the second system memory module 14 to accommodate the logical addresses allocated to the first system memory module 12. The second address translator 146 removes the gaps in the logical addresses to form the continuous sequence of physical addresses transmitted to the second system memory module 14.

Figure 6:
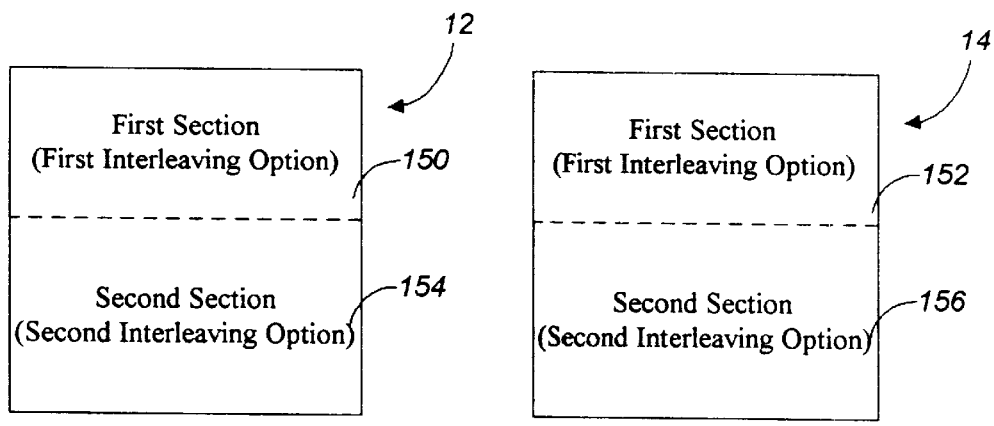
FIG. 6 is a block diagram of interleaved memory modules of the computer system shown in FIG. 1.

In yet another embodiment of the invention shown in FIG. 6, the logical addresses assigned to the system memory module 12, 14 are allocated according to two different interleaving choices. The first and second system memory modules 12, 14 have first sections 150, 152, respectively, that are allocated logical addresses that are interleaved according to a first interleaving option. The first and second system memory modules 12, 14 also include second sections 154, 156, respectively, that are allocated logical addresses that are interleaved according to a second interleaving option. For example, the logical address in the first sections 150, 152 could be paged interleaved while the logical addresses of the second sections 154, 156 could be cache line interleaved, word interleaved, or not interleaved. The address decoders 56, 66 can easily be programmed to provide such dual interleaving options similar to the manner discussed above with respect to FIG. 5.

It should be understood that even though numerous advantages of the present invention have been set forth in the foregoing description, the above disclosure is illustrative only. Changes may be made in detail and yet remain within the broad principles of the present invention.

I claim:

1. A computer system comprising:
   first and second RAM modules for storing digital information, the first and second modules each including first and second sections, the first sections having logical addresses interleaved according to a first interleaving scheme and the second sections having logical addresses interleaved according to a second interleaving scheme; and
   first and second system controllers coupled to the first and second RAM modules, respectively, the first system controller having a first address decoder that allocates to the first RAM module a first set of addresses interleaved according to said first interleaving scheme in the first section and interleaved according to said second interleaving scheme in the second section, and the second system controller having a second address decoder that allocates to the second RAM module a second set of addresses interleaved according to said first interleaving scheme in the first section and interleaved according to said second interleaving scheme in the second section, the second set of addresses having no addresses in common with the first set of addresses, wherein said first interleaving scheme is different from said second interleaving scheme and wherein said first and second interleaving schemes are selected among word-by-word, cache line by cache line, block-by-block, and page-by-page interleaving schemes.

2. The computer system of claim 1 wherein the first system controller includes a configuration register that indicates whether the first set of addresses are interleaved with the second set of addresses, and wherein the first address decoder is structured to use the indication from the configuration register to allocate the first set of addresses to the first RAM module.

3. The computer system of claim 1 wherein the first system controller includes a configuration register that indicates whether the first set of addresses are interleaved with the second set of addresses and, if the first and second sets of addresses are interleaved with each other, indicates types of interleaving employed, and wherein the first address decoder is structured to use the indications from the configuration register to allocate the first set of addresses to the first RAM module.

4. The computer system of claim 1 wherein the first set of addresses is interleaved with the second set of addresses and the first system controller includes an address translator that converts the first set of addresses into a continuous sequence of physical addresses.

5. The computer system of claim 1 wherein each of the first and second RAM modules are asynchronous DRAM modules.

6. A system controller for controlling access to a first RAM module of a computer system that also includes a second RAM module, the first and second RAM modules each having first and second sections, the system controller comprising:

a configuration register structured to output a configuration signal indicating whether logical addresses for the first and second RAM modules should be interleaved; and an address decoder coupled to receive the configuration signal from the configuration register, the address decoder being structured to allocate logical addresses to the first RAM module based on whether the configuration signal indicates that the logical addresses should be interleaved, the address decoder being structured allocated logical addresses to the first RAM module in first and second sections, the first section having logical addresses interleaved with logical addresses allocated to the first section of the second RAM module according to a first interleaving scheme and the second section having logical addresses interleaved with logical addresses allocated to the second section of the second RAM module according to a second interleaving scheme wherein said first interleaving scheme is different from said second interleaving scheme and wherein said first and second interleaving schemes are selected among word-by-word, cache line by cache line, block-by-block, and page-by-page interleaving schemes.

7. The system controller of claim 6 wherein the computer system includes an address bus on which a target address of a memory transaction is transmitted, the system controller further comprising:

a memory controller for controlling how memory transactions are executed by the first RAM module; and a memory selector coupled to the address decoder and the memory controller, the memory selector structured to receive the target address and forward the target address to the first memory controller only if the memory selector receives a chip select signal from the address decoder, the address decoder transmitting the chip select signal to the memory selector in response to determining whether the target address is one of the logical addresses allocated to the first RAM module.

8. The system controller of claim 6 wherein the configuration signal indicates which of a plurality of interleaving schemes should be employed; and the address decoder is structured to allocate the logical addresses to the first RAM module based on the interleaving schemes indicated by the configuration signal.

9. The system controller of claim 6 wherein the address decoder allocates logical addresses to the first RAM module that are interleaved with logical addresses allocated to the second RAM module, the system controller further comprising:

an address translator that converts the logical addresses into a continuous sequence of physical addresses that are used to access the first RAM module.

* * * * *

UNITED STATES PATENT AND TRADEMARK OFFICE
CERTIFICATE OF CORRECTION

PATENT NO. : 6,049,855
DATED : April 11, 2000
INVENTOR(S) : Joseph Jeddeloh

It is certified that error appears in the above-identified patent and that said Letters Patent is hereby corrected as shown below:

<u>Title page,</u>

Title: Change "SEGMENTED MEMORY SYSTEM EMPLOYING DIFFERENT INTERLEAVING SCHEME FOR EACH DIFFERENT MEMORY SEGMENT"

-- A SEGMENTED MEMORY SYSTEM EMPLOYING DIFFERENT INTERLEAVING SCHEME FOR EACH DIFFERENT MEMORY SEGMENT --

Signed and Sealed this

Thirteenth Day of November, 2001

Attest:

NICHOLAS P. GODICI
Attesting Officer    Acting Director of the United States Patent and Trademark Office